United States Patent Office 3,404,512
Patented Oct. 8, 1968

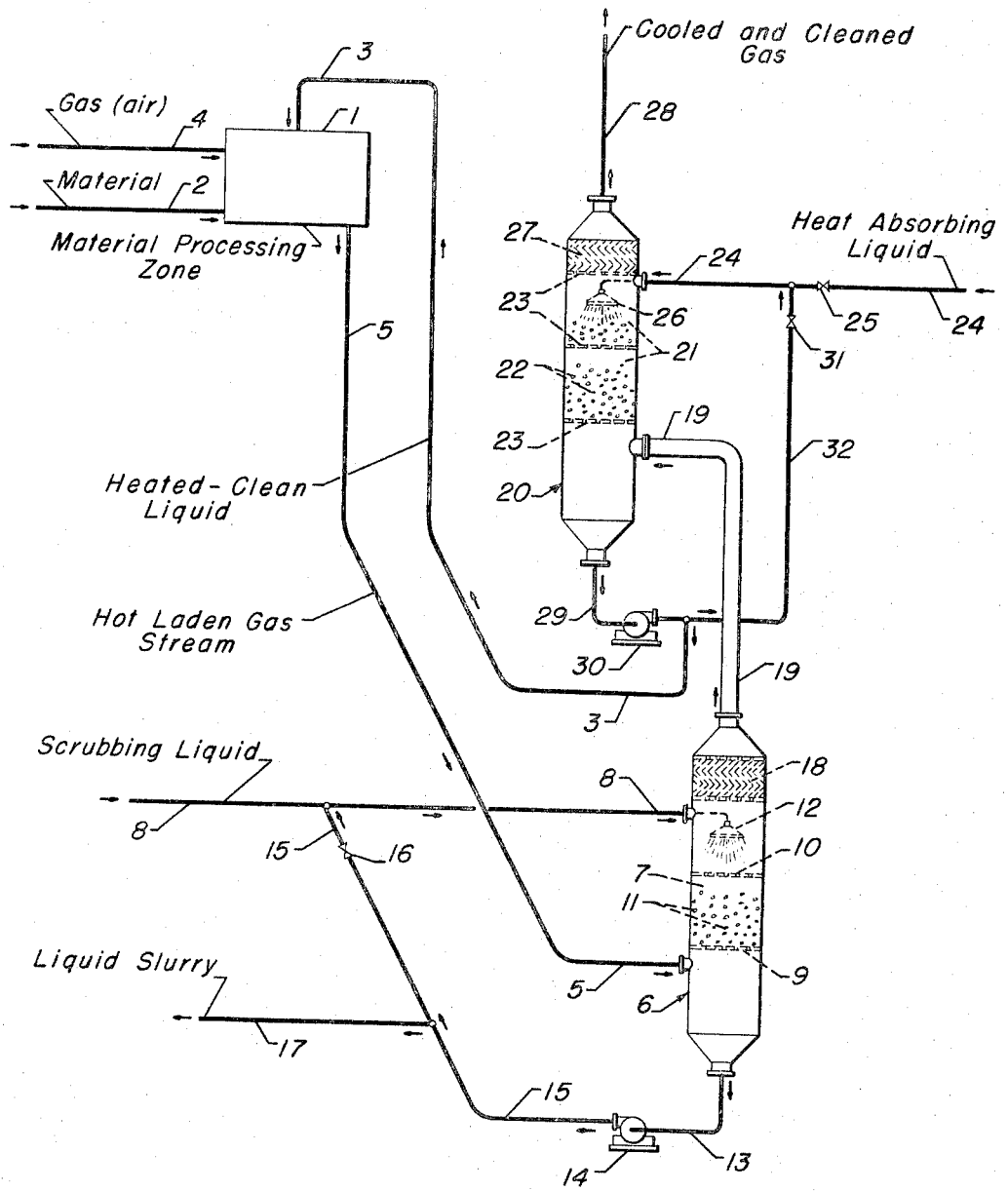

3,404,512
CLEANING-COOLING SYSTEM FOR A HOT
PARTICLE LADEN GAS STREAM
James P. Tomany, Darien, Conn., assignor to Universal
Oil Products Company, Des Plaines, Ill., a corporation
of Delaware
Continuation-in-part of application Ser. No. 524,880,
Feb. 3, 1966. This application Aug. 17, 1967, Ser.
No. 661,471
7 Claims. (Cl. 55—89)

ABSTRACT OF THE DISCLOSURE

A two-stage system for effecting the cleaning and cooling of a hot particle laden gas stream. Each stage effects a counter-current fluid contact in the presence of light weight freely movable contact elements so as to assist in removal of particulates in one instance and the removal of heat in another; with the overall system being operated to conserve heat in the first stage and provide for a greater amount of heat being abstracted from the gaseous stream in the second contacting zone than is abstracted from the gaseous stream in the first zone.

Specification

The present application is a continuation-in-part of my earlier application Ser. No. 524,880, filed Feb. 3, 1966, and now abandoned.

The present invention is related to a cleaning and cooling system for treating a hot particle laden gas stream and more specifically to a two-stage treating system effecting counter-current contact in the presence of a multiplicity of relatively large and light weight contact elements so as to provide, in successive steps, the removal of particulates and the absorption of heat in a clean liquid stream which may be used in a material processing zone.

In effecting the removal of particulates from particle laden gaseous streams, there are of course various types of separator and scrubber means which may be employed; however, one particular form of particle remover means may be of advantage over another because of the nature or type of particles, or because of the nature of the carrying gas. For example, with certain finely divided materials which may be in the less than 5 micron range, it may be advisable to use wet scrubber means rather than mechanical or electrical precipitator equipment. Also, for particulates which are of a sticky nature or that form a gummy slurry when in contact with a scrubbing solution, there may be troublesome operations with conventional types of packed towers and scrubbing methods. Thus, special wet scrubber systems may be necessitated. One advantageous form of scrubber unit makes use of a "movable packing" in the contacting section, or sections. In other words, a multiplicity of relatively large light weight spheres or other contact elements are fluidized and maintained in motion by an upwardly flowing laden gas stream, while at the same time a descending liquid stream passes through the gaseous stream and over the surface of the contact elements. The random motion of the elements and the rubbing action between them will result in a dual advantage of a continuous self-cleaning and the avoidance of the plugging of a contact bed from sticky matter being scrubbed from the gas stream.

It has also been determined for moving contact element type towers, providing one or more contacting zones using light weight fluidizable spheres or other elements, that such chambers may be operated to advantage as a reactor, an absorption chamber, or as a heat exchanger and need not be limited in usage to just scrubbing operations. For example, it appears that a unit utilizing a multiplicity of mobile spheres or other light weight elements for direct contact surfaces can accommodate high gas and liquid flow rates to in turn provide a highly efficient heat exchanger function.

It may be considered a principal object of the present invention to provide in combination with a material processing operation utilizing a heated liquid stream and discharging a particle laden hot gaseous stream, a two-stage system for contacting the gaseous stream so as to purify it and at the same time recover heat in a clean liquid stream which may be returned to the material processing zone.

In order to achieve an overall integrated system of high efficiency, it may be considered a further object of the invention to effect the treating and heat recovery steps for the hot laden gaseous stream in a special manner so as to have different operating conditions in each zone, although the contact zones for both the scrubbing and direct heat exchange functions in turn utilize one or more stages or sections containing light weight, relatively large contact elements that are readily fluidized and maintained in a random movement in confined stages whereby there is an extended surface area for assisting both the scrubbing and heat exchange purposes.

In a broad aspect, the present invention provides a process for removing particulates from a hot laden gaseous stream leaving a material processing zone and for additionally effecting a primary heat recovery in a particle free liquid stream, in a manner which comprises, in a first contacting zone effecting the scrubbing of the hot laden gaseous stream with a first liquid stream in counter-current flow and in the presence of moving contact elements being fluidized in random motion by said gaseous stream, said liquid stream being primarily a recirculated stream at a high temperature to remove particulates from the gaseous stream while retaining a maximum residual heat content of the gases, subsequently passing the resulting cleaned gaseous stream with a high residual heat content to a separate contacting zone and therein effecting a further direct contact of the stream with a heat absorbing liquid medium at a lower temperature than the first liquid stream in the presence of aerated contact elements and thus providing that the amount of heat abstracted from said gaseous stream in said second contacting zone is substantially greater than the amount of heat abstracted from the gaseous stream in the first contacting zone, and then supplying the resulting heated liquid stream substantially devoid of particulates to the processing zone for use therein.

It is not intended to limit the present cleaning and cooling system in combination with any particular material treating or processing zone inasmuch as there are many types of manufacturing and processing operations where heated liquid streams are used to advantage and where there is a discharge of a particle laden gaseous stream which must be treated prior to its discharge to the atmosphere so as to preclude contamination of the surrounding area. For example, in connection with various processing operations where beans, peas, corn, nuts or different grains are washed, treated, roasted, etc., there may be the discharge of an obnoxious particle laden gaseous stream which should be treated to remove particles, but at the same time may contain useful heat which can be advantageously removed and used in the processing zone.

Reference to the accompanying drawing and the following description thereof will serve to illustrate in a diagrammatic manner one embodiment of the present invention, as well as set forth advantageous features in connection therewith. Referring now specifically to the drawing, there is indicated diagrammatically a material processing zone 1 receiving material for treatment by way of line 2, as well as a heated clean liquid stream being introduced by way of line 3. The latter may, for example, be a heated water stream used advantageously as a preliminary wash medium in one or more stages carried out in the processing zone 1. In addition, there is indicated the introduction of a gas or air stream to zone 1 by way of line 4 whereby there may be the entrainment and removal of finely divided particles given off from one or more stages of processing within zone 1. The resulting heated particle laden gas stream is indicated as being discharged from the latter zone by way of line 5.

In accordance with the present invention, a hot particle laden gas stream from conduit 5 is introduced into a first stage wet scrubber unit 6 whereby the gaseous stream and particles may pass upwardly through one or more contact sections 7 in counter-current flow to a liquid medium being introduced by way of line 8. Diagrammatically, there is indicated spaced perforate partitioning members 9 and 10 within chamber 6 which provide a contact stage 7 containing a multiplicity of light weight sperical contact elements 11 which are free to move in a fluidized random movement by upward flow of the gas stream in the unit. Also, there is shown a liquid distributing nozzle 12 from line 8 which serves to provide a descending sprayed liquid stream through the contact section 7 counter-currently to the rising gaseous stream and to spread over the multiplicity of contact elements maintained in the unit. A resulting liquid slurry stream, containing most of the particles that were entrained with the gaseous stream, is collected within and discharged from the lower end of unit 6 by way of line 13. The latter is shown connecting with pump 14 which in turn discharges to line 15, with control valve 16, and to line 17 whereby a portion of the slurry may be discharged and a portion of the liquid slurry recycled to line 8 so as to be reused in the contact section. The preferred operation maintains this recycled stream at a high temperature and only introduces a minimum amount of scrubbing liquor make-up. Generally, the quantity of recycle will be greater than 50% of the total amount of liquid being introduced through line 8 so that a maximum of the residual heat content of the gases leaving scrubber 7 will be maintained for the subsequent contacting zone.

The cleaned hot gaseous stream passing through the upper portion of chamber 6 is subjected to demisting or removal of entrained liquid in separator means 18 and then enters transfer duct 19. The latter carries the gaseous stream with most of the original heat content into a second stage contact unit 20 which in turn may be constructed in a manner similar to that for chamber 6 with one or more contact sections 21 each having a multiplicity of light weight contact spheres or other mobile elements 22 maintained between vertically spaced apart perforate partitioning members, such as 23. Here again, the gaseous stream is caused to pass in an upward flow and effect the fluidization and random movement of the contact elements 22 while at the same time there is a continuous descending liquid flow through each section and over and around such elements to result in a direct counter-current contacting between the liquid and gas flows. A heat absorbent liquid is shown entering the upper portion of the contact chamber 20 by way of line 24 and control valve 25 to in turn be distributed through spray means 26. A resulting cleaned and cooled gaseous stream is then discharged through an upper entrained liquid separator means 27 and the outlet line 28.

In this unit 20, the gas and liquid flow rates shall be controlled so as to provide optimum heat absorption by the liquid stream, with an enhanced efficiency made possible through the direct contact in the presence of the multiplicity of contact elements within the one or more zones 21. Inasmuch as substantially all of the particles are removed in the first stage contact chamber 6, there is a resulting substantially clean heated liquid stream collected within the lower portion of chamber 20 and discharged by way of line 29, pump 30, and line 3. Line 3 in accordance with the present combined system shown, is indicated as connected to and providing a hot liquid stream useful within material processing zone 1.

However, where desirable for temperature control purposes, there may be a recycle of a portion of the heated liquid stream leaving the lower end of chamber 20 in which case the stream passes by way of line 29, pump 30, and valve 31 into line 32 where it re-enters the upper portion of the chamber along with the make up liquid in line 24.

The spheres or other contact elements which are maintained in each of the contact sections of the multiple stage system may be of a size generally from about ½ inch to about 3 inches in diameter, with the optimum size being selected with regard to the size of the chamber or the size of the contact section being used in the system. There may be a variety of shapes and sizes, as well as various materials for the elements; however, conventionally for low temperature operations they will consist of plastic hollow spheres or hollow balls being formed from a thin polypropylene wall or skin. These spherical shapes may of course be made of foamed polystyrene or of perforated polyethylene such that there is some additional surface area resulting from internal surfaces of each element. For high temperature operations, the spheres may be of hollow stainless steel, aluminum, magnesium, or other metal suitable for the particular conditions. In all cases, the spheres are preferably of low density so that they will respond readily to the up flowing gaseous stream and can be easily fluidized and maintained in a random motion. Actually, they can move up and down between the spaced perforate members of a chamber, but generally will be prevented from contacting the upper perforate member of any one section by virtue of the downward liquid flow within each section. For example, the contact elements will generally have a density of less than about 20 pounds per cubic foot and preferably be within a range of about 2 pounds to about 11 pounds per cubic foot. Where metals are used for corrosive gaseous streams or where there is a high temperature stream which may be excessive for polypropylene types of materials, then the hollow spheres or other types of contact elements which are formed or fabricated may have a density which is slightly higher.

In order that the elements remain in a desired random motion while the counter-current flow is being carried out in each of the contact sections it is of course necessary that the flow rates or velocities of both the gas and liquid streams be properly regulated. Also, generally the spheres or other contact elements will occupy less than 50 percent of the volume or open space of each contact section. As an upper limit, gas velocities will be adjusted to preclude lifting the spheres against an upper barrier so that there is maintained a random motion of each of the individual elements. Normally, gas flows through each contact section will be of the order of 500 to 1500 feet per minute, while the liquid flowing downwardly through the unit will be of the order of 5 to 100 gallons per minute per square foot of cross-sectional area. For example, in one operation having a liquid flow of about 45 U.S. gallons per minute and utilizing polypropylene spheres of 1½ inch diameter, with the volume of the spheres comprising about 8 to 9 percent of the total volume of a contact section, there was initial random movement of the spheres at about 550 feet per minute gas velocity and no total lifting of the movable bed against the upper barrier for a velocity of about 1500 feet per minute.

In order that suitable random motion of the spheres may be attained in any given section, it is desirable that there be adequate spacing between trays within any contact unit. For example, spacing between grids will normally be of the order of 3 feet or more and preferably of the order of 4 feet. The spacing, however, will depend upon the density of the particular contact elements being utilized and the resulting fluidity or mobility which will occur to maintain the desired liquid velocities through a unit.

Example I

In order to provide an illustrative example of the present integrated and multiple stage processing system, there may be considered the treatment of beans, grains, or the like, in a food processing section, such as zone 1 in the accompanying drawing, and that a particle laden gaseous stream is leaving the zone 1 by way of a line 5 at the rate of about 20,000 cubic feet per minute and at a temperature of 170° F. The stream is also considered to be carrying an average of about 5 pounds per minute (300 pounds per hour) of finely divided solids entrained from the material processing section. The laden gas stream is subjected to counter-current liquid scrubbing in a tower, which may be similar to that shown as unit 6 in the accompanying drawing, with 400 gallons per minute of water being introduced in a down flow at a temperature of the order of 145° F. Of this amount, 335 gallons per minute at about 156° F. is recirculated and about 65 gallons per minute at 85° F. is from make-up water. Discharge slurry is 70 gallons per minute at 156° F. and the discharge gas from the upper portion of the first stage scrubbing unit leaves at the rate of about 18,700 cubic feet per minute at about 150° F. with most of the solids entrained with the gas having been removed. Generally, residual solids will be less than about 5 pounds per hour in the stream leaving the first stage of scrubbing. On the basis of the discharge slurry being 70 gallons per minute at a temperature of 156° F. there will be a rather low $5.46 \times 10^6$ B.t.u. per hour heat discharge or heat loss from this first stage of the system.

Within the second stage zone, which may be similar to that indicated as 20 within the accompanying drawing, there is again a counter-current flow between the discharge gaseous stream and a descending heat absorbing liquid stream in the presence of fluidized randomly moving spheres or other contact elements. With a descending liquid flow rate of 560 gallons per hour through the bed, there is a resulting approximate 580 gallons per minute of heated water (or other liquid heat exchange medium) at a temperature of the order of 125° F. Such heated stream may be returned to the material processing zone in accordance with the combined system of the present invention. The resulting cooled gaseous stream is discharged from the upper portion of the second stage contact zone at a rate of about 13,100 cubic feet per minute and at a temperature of the order of 90° F. On the basis of 580 gallons per minute of heated water at 125° F. there will be approximately $36.3 \times 10^6$ B.t.u. per hour of heat content abstracted from the second stage of the system. Generally, for a summer time operation there will be no need of recirculation of any water within the second stage section; however, for a winter time operation in a cold zone it may be of advantage to effect a recirculation of a portion of the liquid stream in order to overcome an otherwise low temperature for the make-up water. In any event, it should be noted that the quantity of heat abstracted from the second contacting zone is many times greater than that being abstracted from the first contacting zone.

Example II

In an operation similar to that set forth in the foregoing Example I, there may be considered the treatment of a particle laden gaseous stream under winter time conditions, where make-up water in each instance is of the order of 35° F., rather than 85° F. as set forth in Example I. At a 170° F. temperature for the laden gaseous stream and with the same solids loading, there may be utilized a lesser amount of make-up water of the order of 38 gallons per minute at 35° F., a recirculation rate of 335 gallons per minute at 156° F. and a reduced slurry discharge rate of the order of 43 gallons per minute whereby to maintain the 400 gallon per minute flow in the contacting section at the 145° F. temperature.

In the second stage section where there is primarily a heat absorption function with a clean liquid stream, there may be a recirculation of 300 gallons per minute at 125° F. and a reduced make-up water stream of 260 gallons per minute at 35° F., rather than the total 560 gallons per minute summer time fresh make-up water. In this instance there will be maintained the desired 560 gallons per minute at about 85° F. within the contact section or sections of the heat absorption stage but a reduced volume of only about 280 gallons per minute at 125° F. is available for return to the material processing zone. In this operation, $3.36 \times 10^6$ B.t.u. per hour of heat content is withdrawn from the first contacting stage and $17.5 \times 10^6$ B.t.u. per hour of heat content is withdrawn from the second stage liquid heating zone.

For convenience, reference may be made to the accompanying Table 1 which shows in a summary form the operation of the combined cooling-cleaning system for both Examples I and II.

It may be pointed out that the present examples and the prior description has been primarily directed to a combined overall system where there is a scrubbing operation in a first stage counter-current contact and a heat absorption function in a second stage counter-current contact. There may of course be other types of actual reactions which may take place within a first stage unit in the presence of a fluidized bed of particles or contact elements and there need not be the limitation to the removal of entrained particulates.

TABLE 1

| | Entering Gas | | | Discharge Gas | | Make-up Liquor | | Recirc. Liq. | | Discharge Liq. | | Heat Abstracted, B.t.u. |
|---|---|---|---|---|---|---|---|---|---|---|---|---|
| | Flow | Temp. | Solids | Flow | Temp., °F. | Flow, gpm | Temp., °F. | Flow | Temp., °F. | Flow | Temp., °F. | |
| Example: | | | | | | | | | | | | |
| Section I | 20,000 | 170 | 300 | 18,700 | 150 | 65 | 85 | 335 | 156 | 70 | 156 | $5.46 \times 10^6$ |
| Section II | 18,700 | 150 | 4.5 | 13,100 | 90 | 560 | 85 | 0 | 125 | *580 | 125 | $36.3 \times 10^6$ |
| Example II: | | | | | | | | | | | | |
| Section I | 20,000 | 170 | 300 | 18,700 | 150 | 38 | 35 | 335 | 156 | 43 | 156 | $3.36 \times 10^6$ |
| Section II | 18,700 | 150 | 4.5 | 13,100 | 90 | 260 | 35 | 300 | 125 | *280 | 125 | $17.5 \times 10^6$ |

*Available for use in Material Processing Zone.

I claim as my invention:

1. A process for removing particulates from a hot laden gaseous stream leaving a material processing zone and for additionally effecting a heat recovery in a particle free liquid stream, which comprises, in a first contacting zone effecting the scrubbing of the hot laden gaseous stream with a first liquid stream in counter-current flow and in the presence of moving contact elements being fluidized in random motion by said gaseous stream, said liquid stream being primarily a recycled stream at high temperature to remove particulates from the gaseous stream while retaining a maximum residual heat content of the gases, subsequently passing the resulting cleaned gaseous stream with residual heat content to a separate second contacting zone and therein effecting a further direct contact of the stream with a heat absorbing liquid medium at a lower temperature than said first liquid stream in the presence of aerated contact elements and providing that the amount of heat abstracted from said gaseous stream in second contacting zone is substantially greater than the amount of heat abstracted from the gaseous stream in said first contacting zone, and then supplying the resulting heated liquid stream substantially devoid of particulates to the processing zone for use therein.

2. The process of claim 1 further characterized in that the heat absorbing liquid medium passing down over said elements in the counter-current flow in said second contacting zone comprises a minimum of recycle liquid whereby to effect maximum heat recovery from such zone.

3. The process of claim 1 further characterized in that the contact elements in each contact zone are substantially spherical and have a diameter in the range of about ½ inch to about 3 inches and a density of less than about 20 pounds per cubic foot.

4. The process of claim 1 further characterized in that the volume of the contact elements of each contact section is less than 50 percent of the volume of such section.

5. The process of claim 4 further characterized in that the velocity of the gaseous stream and the velocity of the scrubbing and heat absorbing liquid mediums are regulated such that the contact elements are in turn maintained in a random fluidized distribution.

6. The process of claim 5 still further characterized in that the upward flow of the gas in each contacting zone is such that it is greater than about 500 feet per minute.

7. The process of claim 6 still further characterized in that the liquid medium down flow in each contacting zone is within the range of 5 to 100 gallons per minute per square foot of cross-sectional area.

References Cited

UNITED STATES PATENTS

| | | | |
|---|---|---|---|
| 2,838,135 | 6/1958 | Pilo et al. | 55—94 X |
| 2,876,865 | 3/1959 | Cobb | 55—94 X |
| 3,073,092 | 1/1963 | Ancrum et al. | 55—94 X |
| 3,122,594 | 2/1964 | Kielback | 55—91 X |

REUBEN FRIEDMAN, *Primary Examiner.*

J. ADEE, *Assistant Examiner.*